(12) United States Patent
Vente et al.

(10) Patent No.: US 11,724,555 B2
(45) Date of Patent: Aug. 15, 2023

(54) METHOD AND APPARATUS FOR RESPONDING TO ROAD SURFACE DISCONTINUITIES

(71) Applicant: ClearMotion, Inc., Billerica, MA (US)

(72) Inventors: Gert-Jan Alexander Vente, North Andover, MA (US); Matthew Jo Taylor, Kenilworth (GB)

(73) Assignee: ClearMotion, Inc., Billerica, MA (US)

( * ) Notice: Subject to any disclaimer, the term of this patent is extended or adjusted under 35 U.S.C. 154(b) by 0 days.

(21) Appl. No.: 17/285,174

(22) PCT Filed: Oct. 18, 2019

(86) PCT No.: PCT/US2019/057006
§ 371 (c)(1),
(2) Date: Apr. 14, 2021

(87) PCT Pub. No.: WO2020/081980
PCT Pub. Date: Apr. 23, 2020

(65) Prior Publication Data
US 2021/0394573 A1    Dec. 23, 2021

Related U.S. Application Data

(60) Provisional application No. 62/747,811, filed on Oct. 19, 2018.

(51) Int. Cl.
*B60G 17/0165* (2006.01)
*B60G 17/08* (2006.01)

(52) U.S. Cl.
CPC ......... *B60G 17/0165* (2013.01); *B60G 17/08* (2013.01); *B60G 2400/204* (2013.01); *B60G 2400/61* (2013.01); *B60G 2400/821* (2013.01); *B60G 2500/32* (2013.01)

(58) Field of Classification Search
CPC ............... B60G 17/0165; B60G 17/08; B60G 2400/204; B60G 2400/61; B60G 2400/821; B60G 2500/32; B60G 2202/24
See application file for complete search history.

(56) References Cited

U.S. PATENT DOCUMENTS

| | | |
|---|---|---|
| 8,589,063 B2 | 11/2013 | Trum |
| 10,486,485 B1 | 11/2019 | Levinson et al. |
| 10,901,432 B2 | 1/2021 | Sridhar et al. |
| 10,953,887 B2 | 3/2021 | Magnusson et al. |

(Continued)

FOREIGN PATENT DOCUMENTS

| | | |
|---|---|---|
| DE | 10 2007 046040 A1 | 4/2009 |
| DE | 102008032545 A1 | 1/2010 |

(Continued)

OTHER PUBLICATIONS

International Search Report and Written Opinion for International Application No. PCT/US2019/057006 dated Feb. 27, 2020.

*Primary Examiner* — Drew J Brown
(74) *Attorney, Agent, or Firm* — Wolf, Greenfield & Sacks, P.C.

(57) ABSTRACT

Disclosed embodiments are related to suspension systems including dampers and suspension actuators and related methods of control for mitigating the effects of potholes and other road surface discontinuities.

17 Claims, 13 Drawing Sheets

(56) References Cited

U.S. PATENT DOCUMENTS

| | | | |
|---|---|---|---|
| 2004/0145100 A1* | 7/2004 | Delorenzis | B60G 17/0152 267/64.28 |
| 2006/0173596 A1* | 8/2006 | Hohmann | B60G 17/0165 280/5.5 |
| 2010/0023211 A1 | 1/2010 | Ammon et al. | |
| 2011/0127127 A1 | 6/2011 | Hirao et al. | |
| 2014/0039758 A1 | 2/2014 | Schindler et al. | |
| 2014/0195112 A1* | 7/2014 | Lu | B60G 17/06 703/2 |
| 2014/0222287 A1* | 8/2014 | Popham | B60G 17/0165 701/37 |
| 2014/0232082 A1* | 8/2014 | Oshita | B60G 17/0162 280/124.161 |
| 2014/0303844 A1 | 10/2014 | Hoffman et al. | |
| 2015/0006030 A1 | 1/2015 | Bennett | |
| 2015/0021866 A1* | 1/2015 | Solbrack | B60G 17/0165 280/6.155 |
| 2015/0224845 A1* | 8/2015 | Anderson | B60G 17/019 701/37 |
| 2016/0046166 A1 | 2/2016 | Norton et al. | |
| 2016/0347143 A1* | 12/2016 | Hrovat | B60W 50/14 |
| 2017/0087951 A1 | 3/2017 | Hrovat et al. | |
| 2017/0320368 A1* | 11/2017 | Masamura | B60G 17/018 |
| 2018/0015801 A1 | 1/2018 | Mohamed et al. | |
| 2018/0079272 A1 | 3/2018 | Aikin | |
| 2019/0079539 A1 | 3/2019 | Sridhar et al. | |
| 2019/0137275 A1 | 5/2019 | Choudhury et al. | |
| 2020/0117199 A1 | 4/2020 | Akella et al. | |
| 2020/0139784 A1 | 5/2020 | Sridhar et al. | |
| 2020/0139967 A1 | 5/2020 | Beller et al. | |
| 2020/0211394 A1 | 7/2020 | King et al. | |
| 2021/0055740 A1 | 2/2021 | Sridhar et al. | |
| 2021/0394573 A1 | 12/2021 | Vente et al. | |
| 2022/0082705 A1 | 3/2022 | Graves et al. | |

FOREIGN PATENT DOCUMENTS

| | | |
|---|---|---|
| DE | 10 2012 024086 A1 | 6/2014 |
| DE | 102014223475 A1 | 5/2016 |
| WO | WO 2012/019691 A1 | 2/2012 |
| WO | WO 2019/049080 A2 | 3/2019 |

* cited by examiner

METHOD AND APPARATUS FOR RESPONDING TO ROAD SURFACE DISCONTINUITIES

RELATED APPLICATIONS

This application is a national stage filing under 35 U.S.C. § 371 of International Patent Application Serial No. PCT/US2019/057006, filed Oct. 18, 2019, which claims the benefit of priority under 35 U.S.C. § 119(e) of U.S. Provisional Application Ser. No. 62/747,811, filed Oct. 19, 2018, each of which is incorporated herein by reference in its entirety.

FIELD

Disclosed embodiments are related to suspension systems including dampers and suspension actuators and their control for mitigating the effects of potholes and other road surface discontinuities.

BACKGROUND

The suspension system of a vehicle is intended to at least partially shield the occupants from road-induced disturbances and to mitigate the effects of travel related accelerations such as in the lateral, longitudinal and vertical directions. One type of jarring incident frequently encountered during vehicle travel occurs when one or more wheels of a vehicle traverse a pothole or a depression or pit in a road surface. Not only can this be a jarring experience for vehicle occupants, but it can also cause significant damage to the vehicle suspension, wheels, and tires.

SUMMARY

In some embodiments of an active suspension actuator of a suspension assembly of a vehicle, information about a pothole may be collected. The pothole may have a floor and a length along a direction of travel of the vehicle. Based at least partially on the information about the pothole, a controller may be used to select one of at least two strategies for traversing the pothole, with a wheel of a first suspension assembly. A first strategy may include traversing most of the length of the pothole while the wheel of the first suspension assembly is airborne (i.e. not touching or effectively not touching the floor of the pothole). The second strategy may include traversing most of the length of the pothole while the wheel of the first suspension assembly is in contact or effectively in contact with the pothole floor, for example by rolling along the floor of the pothole. In some embodiments a damping element of the first suspension assembly may be activated to implement the selected strategy. In some embodiments, the information collected may also include information about the vehicle, for example speed of the vehicle or the mass distribution of the sprung mass of the vehicle. In some embodiments, information about the pothole may include the relative position of the pothole relative to the vehicle. The information collected, in some embodiments, may include data from a map, GPS data, terrain-based localization data, and/or data from sensors associated with a first wheel that precedes a second wheel of the vehicle.

In some embodiments where the selected strategy is the first strategy described above a projected mismatch distance may be determined between the wheel and the road surface at the end of the pothole. In some embodiments, a predetermined compressive force may be applied to the wheel assembly, with the suspension actuator of the first suspension assembly to reduce the anticipated mismatch at the end of the pothole. In some embodiments the ride height of the vehicle may be adjusted, for example increased, by using an actuator of a second and/or a third suspension assembly during the period when the wheel of the first suspension assembly is airborne and traversing the pothole.

In some embodiments a compressive force may be applied with the actuator of a fourth suspension assembly at least during the period when the wheel, associated with the first suspension assembly is airborne, wherein the fourth suspension assembly is at a corner of the vehicle located diagonally opposite to the corner where the first suspension assembly is located. In some embodiments a locking mechanism may be used to lock the actuator of the first suspension assembly to prevent extension of the actuator at least during the period when the wheel, of the first suspension assembly, is airborne.

In some embodiments of an active suspension system of a vehicle, a discontinuity in a road surface may be detected. The discontinuity may be traversed with a wheel of a first suspension assembly of the active suspension system by controlling a suspension actuator of the first suspension assembly with a controller to apply a compressive force on a spring element operationally interposed between the vehicle's sprung mass and the wheel of the first suspension assembly. The wheel associated with the first suspension assembly may be airborne during at least a portion of the period when the discontinuity is being traversed and/or the wheel of the first suspension assembly is airborne. In some embodiments the suspension actuator of at least a second suspension assembly may be controlled, at least during the period when the wheel of the first suspension assembly is airborne, to apply an extension force on a spring element operationally interposed between the vehicle's sprung mass and a wheel associated with the second suspension assembly to increase a load applied to the corresponding wheel which may, in some embodiments, increase a ride height of the vehicle. In some embodiments, a suspension actuator of a third suspension assembly may be controlled, at least during the period when the wheel of the first suspension assembly is airborne, to apply a compressive force on a spring element operationally interposed between the vehicle's sprung mass and a wheel of the third suspension assembly which may reduce a load applied to the corresponding wheel. In certain operational conditions the discontinuity may be a pothole. In some embodiments, the second suspension assembly may be located at a corner of the vehicle opposite the first suspension assembly in a fore/aft direction and/or a side to side direction of the vehicle. Correspondingly, the third suspension assembly may be located at a corner of the vehicle diagonally opposite from the corner where the first suspension assembly is located.

In some embodiments, a suspension system of a vehicle may include a first suspension assembly. The first suspension assembly may include a spring element operationally interposed between the vehicle's sprung mass and a wheel assembly and a damping element, also operationally interposed between the vehicle's sprung mass and the wheel assembly in parallel to the spring element. The damping element may include hydraulic cylinder with a piston, connected to a piston rod, that separates the hydraulic cylinder into a compression volume and an extension volume; and a valve assembly configured to block fluid flow from the extension volume in a first mode of operation (for example during extension) while allowing fluid flow into the extension volume during the a second mode of operation (example during compression). A compression volume may be a volume adjacent to a side of the piston that is compressed when the damping element is compressed and the extension volume may be a volume adjacent to a second side of the piston, opposite the first, that is compressed when the damping element is extended. In some embodiments, the valve assembly may be configured to allow fluid flow into and out of the extension volume during a mode of operation. In some embodiments the valve assembly may include at least one valve that is electrically controlled. In some embodiments the valve assembly may also include at least one valve that is a passive valve. In some embodiments the damping element may be an active suspension actuator that has two fluid flow paths. A first fluid flow path may pass through a hydraulic pump/motor while the second fluid flow path does not. The flow in the second fluid flow path may the controlled by one or more valve that may include an electrically controlled valve.

In another embodiment, a method of controlling an active suspension actuator of a suspension assembly of a vehicle includes: collecting information about a pothole that has a floor and a length along a direction of travel of the vehicle; based at least partially on the information about the pothole, selecting one of at least two strategies, for traversing the pothole with a wheel of a first suspension assembly, wherein a first strategy includes traversing most of the length while the wheel of the first suspension assembly is airborne and a second strategy includes traversing more than half of the length while the wheel of the first suspension assembly is in contact with the pothole floor; activating a damping element of the first suspension assembly of the vehicle; and implementing the selected strategy.

In yet another embodiment, a method of controlling an active suspension system of a vehicle includes: detecting a discontinuity in a road surface; traversing the discontinuity with a wheel of a first suspension assembly of the active suspension system; controlling a suspension actuator of the first suspension assembly with a controller to apply a compressive force on a spring element operationally interposed between the vehicle's sprung mass and the wheel of the first suspension assembly; and keeping the wheel of the first suspension assembly airborne during at least a portion of the wheel traversing the discontinuity.

In still another embodiment, a suspension system of a vehicle includes a first suspension assembly. The first suspension assembly that may include a spring element operationally interposed between the vehicle's sprung mass and a wheel assembly and a damping element operationally interposed between the vehicle's sprung mass and the wheel assembly in parallel with the spring element. The damping element may include a hydraulic cylinder with a piston, connected to a piston rod, that separates the hydraulic cylinder into a compression volume and an extension volume; and a valve assembly configured to block fluid flow from the extension volume in a first mode of operation while allowing fluid flow into the extension volume during the first mode of operation.

In another embodiment, a method of controlling an active suspension system of a vehicle with four wheels associated with four corners of the vehicle includes: using a first suspension assembly to apply a first force with a first magnitude, to at least partially support a first corner of the vehicle; using the first suspension assembly to apply a second force with a second magnitude, to at least partially support a second corner of the vehicle, wherein the second corner is adjacent to the first corner; obtaining information that a first wheel associated with the first corner has or is about to become airborne while traversing a pothole; and at least partly based on the information, using an active suspension actuator associated with the second corner to increase the magnitude of the second force.

In yet another embodiment, a method of controlling an active suspension system of a vehicle includes: determining that a first wheel of a vehicle will traverse a road discontinuity; and increasing a ride height of the vehicle based at least in part on determining that the first wheel will traverse the road discontinuity.

In still another embodiment, a method of controlling an active suspension system of a vehicle includes: determining that a first wheel of a vehicle will traverse a road discontinuity; and at least partially restraining movement of the first wheel into the road discontinuity, for example by using an active suspension actuator, at least while the first wheel traverses the road discontinuity.

In another embodiment, a method of controlling an active suspension system of a vehicle includes: determining that a first wheel of a vehicle will traverse a road discontinuity; and reducing a load applied to a second wheel at a corner of the vehicle located diagonally opposite from a corner of the vehicle the first wheel is located at while the first wheel traverses the road discontinuity.

It should be appreciated that the foregoing concepts, and additional concepts discussed below, may be arranged in any suitable combination, as the present disclosure is not limited in this respect. It should be further understood, that the disclosure is not limited to the precise arrangements, variants, structures, features, embodiments, aspects, methods, advantages, improvements, and instrumentalities shown and/or described. Additionally, the various arrangements, variants, structures, features, embodiment, aspects, methods, and instrumentalities may be used singularly in the system or method or may be used in combination with other arrangements, variants, structures, features, embodiment, aspects, methods, and instrumentalities. Further, other advantages and novel features of the present disclosure will become apparent from the following detailed description of various non-limiting embodiments when considered in conjunction with the accompanying figures.

DETAILED DESCRIPTION

The adverse effects of traversing discontinuities in a road surface, for example, a pothole or other depression may depend, for example, on the length and/or depth of the discontinuity, the speed of the vehicle, the weight of the sprung mass and/or un-sprung mass, the weight distribution of the sprung mass, and the construction of the suspension system of the vehicle. Inventors have recognized that these and other adverse effects may be ameliorated by a properly designed, configured, and operated active suspension system. As used herein, unless context indicates otherwise, the term pothole means a depression that is sized and/or positioned relative to a vehicle in a manner where one wheel may enter the pothole while, simultaneously, the remaining wheels may remain on the road surface.

Typically, the weight of the sprung mass, i.e. total vehicle body weight (TVW), including, for example, the weight of a vehicle body, the occupants and any cargo in the vehicle, is supported by multiple forces, or components of forces, in the vertical direction applied by the road surface to one or more wheels/tires of the vehicle and transmitted to the vehicle body by the vehicle suspension system.

Figure 1:
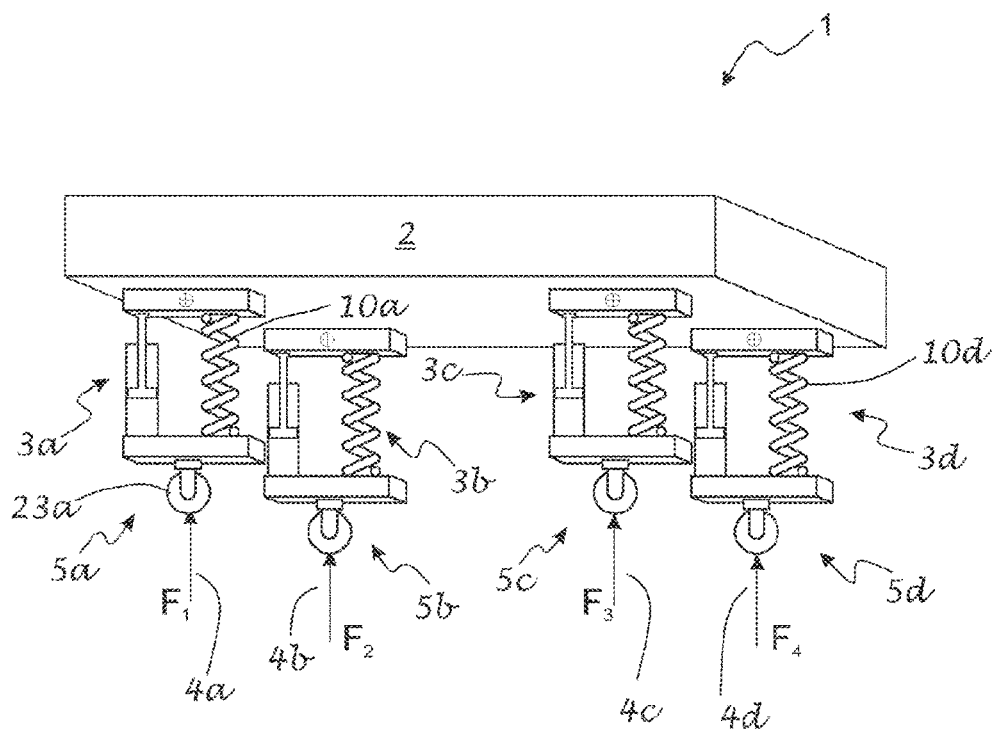
FIG. 1 illustrates a vehicle with four suspension assemblies.

FIG. 1 illustrates a vehicle 1 that is stationary or travelling at a constant velocity (i.e. zero acceleration) on a horizontal road surface (not shown). Under conditions where the vehicle is not undergoing acceleration, the vehicle's suspension may be exposed to static forces as a result of the TVW. In the embodiment of FIG. 1, the vehicle 1 includes vehicle body 2 and four suspension assemblies 3a-3d. The weight of the vehicle body 2 and contents (not shown) is supported by road reaction force 4a ($F_1$, applied to the left front tire), road reaction force 4b ($F_2$, applied to the right front tire), road reaction force 4c ($F_3$, applied to the left rear tire) and road reaction force 4d ($F_4$, applied to the right rear tire). For a vehicle that is not accelerating, the sum of these forces $F_1$, $F_2$, $F_3$, and $F_4$ may be equal to the TVW. The road reaction forces 4a-4d in FIG. 1 are represented by vertical arrows of equal length, but this is not to indicate that the four forces are necessarily of equal magnitude in all embodiments and/or under all conditions. In some embodiments, all the vertical forces, when the vehicle is not accelerating, may be equal, approximately equal to each other (i.e. all forces are within +/−10% of the mean of the forces), or significantly different from each other (i.e. at least one of the indicated forces is greater than +/−10% of the mean of all the forces).

It is also noted that only a portion of the total force applied by the road surface at each wheel, may be transmitted to the vehicle body, since the road also supports, for example, the weight of each unsprung mass as well.

In some embodiments, the average values of these forces ($F_{1ave}$, $F_{2ave}$, $F_{3ave}$, and $F_{4ave}$) over an extended period, such as, for example, an hour, a day or longer, may remain constant with the sum of the average quantities being equal to the TVW. Instantaneously, however, especially during dynamic operation of the vehicle, in some embodiments, these forces may vary due to the dynamics of the vehicle such as, for example, the forces $F_2$ and $F_3$ may increase when the vehicle rolls because it is making a right turn. Under such circumstances, the increase may be a function of the speed of the vehicle and the radius of the turn. Concurrently, forces $F_2$ and $F_4$ may decrease in magnitude. Additional forces may also be applied to the tires or wheels in the transverse or lateral direction. In some embodiments when the vehicle is braking, the forces $F_1$ and $F_2$ may initially increase, while $F_3$ and $F_4$ may initially decrease as the vehicle pitches forward. In some embodiments, when a vehicle traverses a trough between two hills, each of the forces $F_1$-to-$F_4$ may peak, at the point where the corresponding wheel reverses direction of its vertical travel, and then return to its mean value.

In the embodiment of FIG. 1, the forces $F_1$-$F_4$ are transferred to the vehicle body 2 by suspension assemblies 3a-3d. The assemblies that are operatively interposed between the vehicle body 2 and wheel assemblies 5a-5d respectively. In some embodiments, each of the suspension assemblies may include a spring-element (e.g., without limitation, a coil spring, a leaf spring, an air spring, and/or any other appropriate spring) and a damping-element (e.g., without limitation, a passive damper, a semi-active damper, and/or an active suspension actuator). A damping element that is an active actuator may alternatively be referred to herein as an active suspension actuator. An active suspension actuator is an actuator, operatively interposed between a sprung mass (e.g. a vehicle body) and an unsprung mass (e.g. wheel assembly), that can apply an active force (i.e. a force in the direction of motion) as well as a passive or resistive force (i.e. a force in a direction that is opposite the direction of motion).

In some embodiments, each suspension assembly may include a spring-element that is operatively interposed between the vehicle body and the wheel in a parallel orientation relative to the damping-element. In some embodiments, a suspension assembly may also include a top mount or other mounting device (not shown) that is interposed between the damping-element and the vehicle body such that the top mount may be viewed as being in line with the damping element.

Figure 2:
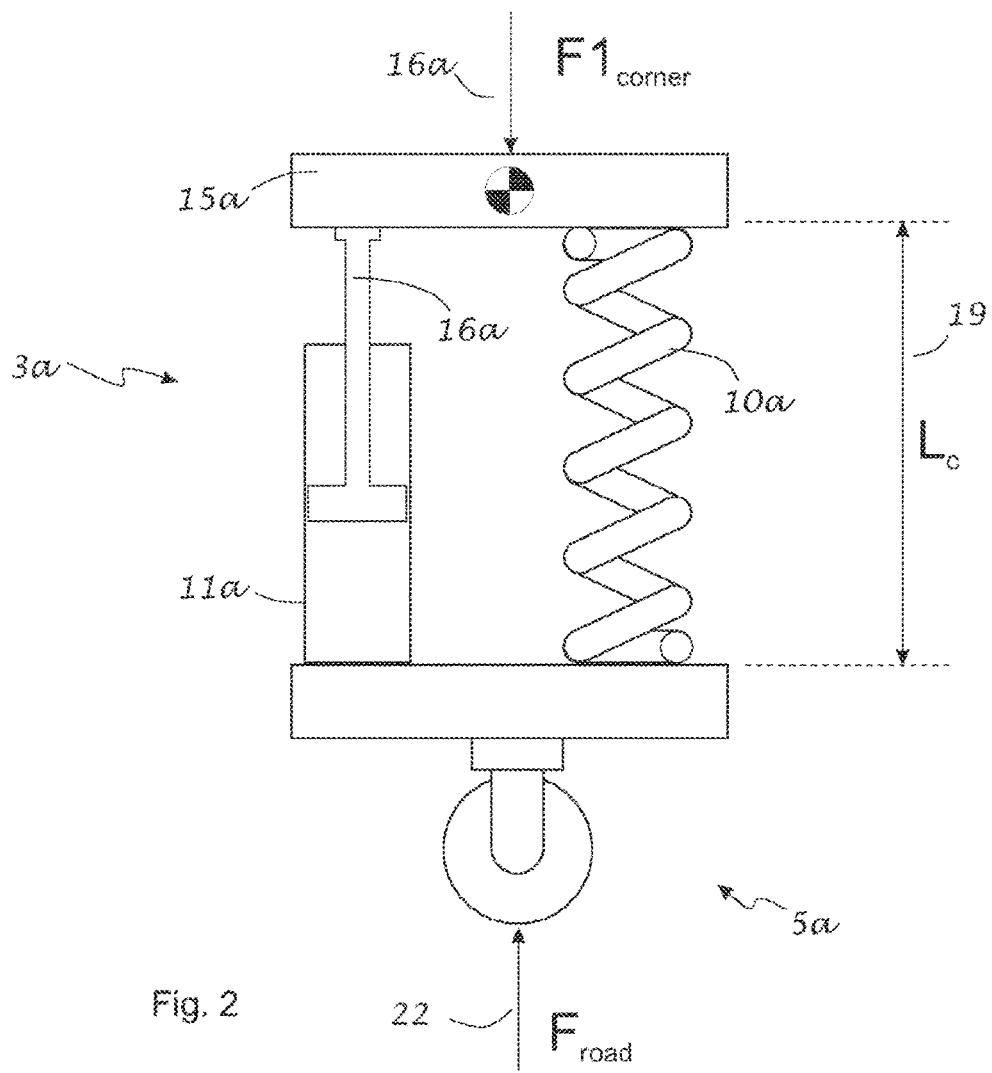
FIG. 2 illustrates the front left suspension assembly of FIG. 1.

FIG. 2 illustrates suspension assembly 3a of the suspension system of FIG. 1, which includes a spring-element 10a and a damping-element 11a. In this embodiment, the spring-element and the damping-element are arranged in a parallel orientation. The spring-element 10a and damping-element 11a are both interposed in between the vehicle body (i.e. sprung mass, not shown) and the wheel assembly (i.e. unsprung mass) 5a. The spring-element and the damping-element may be connected directly to the vehicle body or by means of one or more intervening devices 15a. The intervening devices may be, for example, a top mount and/or an upper spring perch. The corner force 16a ($F1_{corner}$) applied to the suspension assembly 3a by the vehicle body represents the net force supported by suspension assembly 3a. $F1_{corner}$ may include the sum of a portion of the TVW and the dynamic forces applied to the right front suspension assembly. In the embodiment in FIG. 2, the force $F1_{corner}$ applied to the intervening device 15a is resisted by the forces applied by the damping-element and/or the spring-element. Under static conditions, the force applied by the damping-element (that is not being compressed or extended) may be zero under certain conditions, but it may also be significant. In some embodiments, the force applied by the damping element may surpass the force applied by the spring-element, for example, when the damping-element is an active suspension actuator.

In some embodiments, where the damping-element is a passive or semi-active damper even under static conditions (i.e. where the damper element is not undergoing compression or extension) the damper element may apply an extension force that may be equal to, for example, the pre-charge pressure multiplied by the cross-sectional area of the piston rod 16a. This force applied by the damping-element due to the pre-charge pressure is hereinafter referred to as pre-charge-force of the damping-element. In some embodiments, mechanical, electrical and/or hydraulic locking mechanisms may be included (as described below), which may be used to lock the wheel assembly in place relative to the vehicle body in compression and/or in extension.

If the damping-element in the suspension assembly is an active suspension actuator, the damping-element may apply any compression or extension force within the performance characteristic limits of the actuator. This force may be an active force (i.e. force in the direction of motion) or a passive force (i.e. a force that resists motion). The force applied by the damping-element may be equal to, greater than, or less than the force applied by the spring-element at any given position of the wheel assembly relative to the vehicle body. An active force applied by the active suspension actuator during compression is herein referred to as an active-compression force. An active force applied by the active suspension actuator during extension is herein referred to as an active-extension force.

Figure 3:
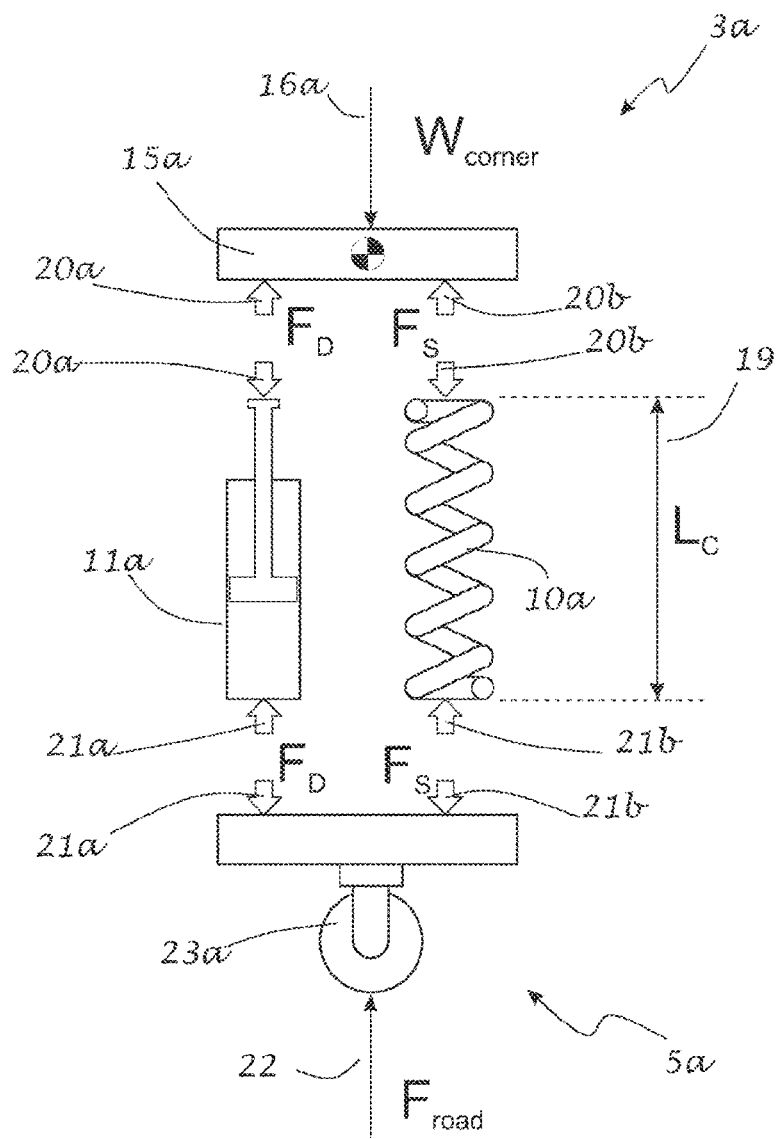
FIG. 3 shows an exploded view of the suspension assembly of FIG. 2.

FIG. 3 illustrates an exploded view of the suspension assembly 3a under static conditions (i.e. where the acceleration of the vehicle is zero). The corner force 16a may be equal to the corner weight $W_{corner}$ (i.e. the portion of the TVW supported by suspension assembly 3a). The other suspension assemblies may also support equal or approximately equal corner weights such that the sum of all the corner weights may be equal to the TVW.

The $W_{corner}$ is supported by damper force 20a $F_D$ and spring force 20b $F_S$. The damping-element 11a and spring-element 10a also simultaneously apply forces 21a and 21b on the wheel assembly that are equal in magnitude to 20a and 20b respectively. The road reaction force 22 ($F_{road}$) applied by the road surface is equal to and resists the sum of forces 21a and 21b plus the weight of the unsprung mass. Under these conditions, the spring-element is compressed by a force 20b (which is equal to 21b) resulting in a compressed length 19 ($L_C$) of the spring-element. $L_C$ may be determined from equation 1:

$$F_S = K(L_F - L_C) \qquad \text{eq. 1}$$

where K is the spring constant of the spring-element 10a and $L_F$ is the unstressed (i.e. free) length of the spring-element, as discussed below. In the art, Equation 1 is sometimes referred to as Hooke's Law.

The equilibrium static forces shown in FIG. 3 may be disturbed by, for example, acceleration of the vehicle and/or the wheel assembly in one or more directions. The equilibrium may also be disturbed if the wheel 23a becomes airborne, e.g. while traversing a pothole.

If wheel 23a becomes airborne, then the forces applied to the wheel assembly 5a may no longer be in balance and the wheel assembly may begin to accelerate according to Equation 2.

$$\Sigma F = M_{US} \times a_{US} \qquad \text{eq. 2}$$

where $\Sigma F$ is the net force on the wheel assembly (i.e. the sum of the unbalanced forces), $M_{US}$ is the mass of the unsprung mass and $a_{US}$ is the acceleration of the unsprung mass.

Figure 4:
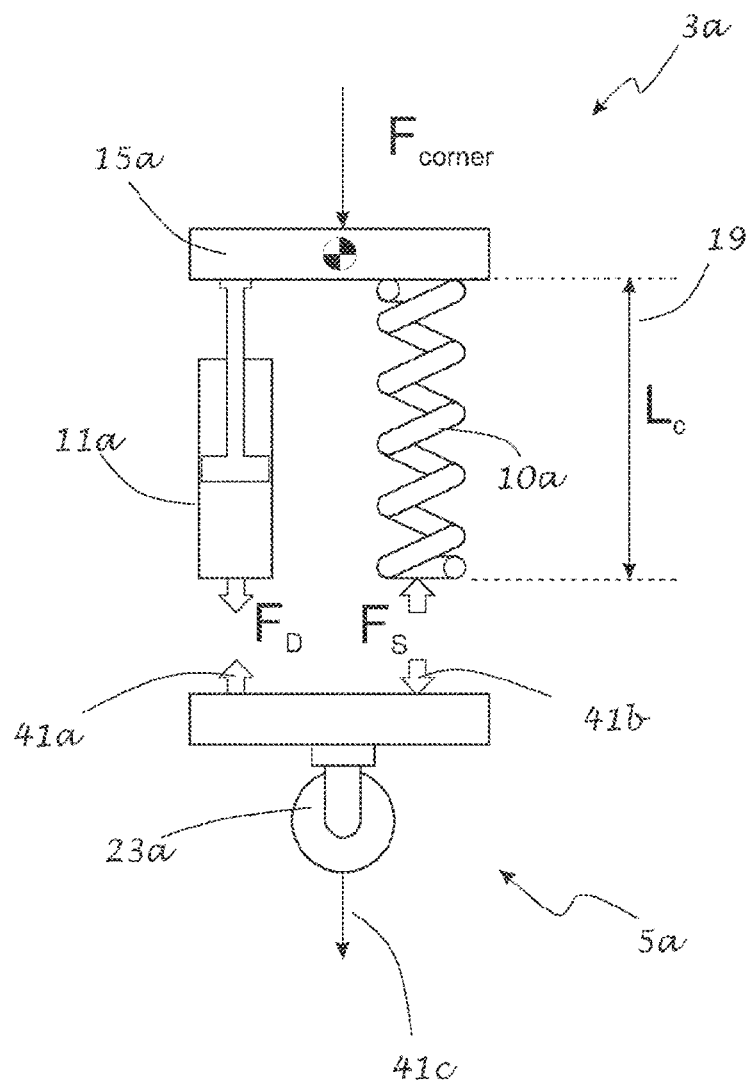
FIG. 4 illustrates a partially exploded view of the suspension assembly of FIG. 2.

FIG. 4 illustrates a condition of the suspension assembly 3a where the force applied by the ground is absent or effectively absent, for example, as a result of the wheel 23a becoming airborne. In this embodiment, for example, when the wheel 23a becomes airborne, there may be three forces that act on the unsprung mass ($M_{US}$) (1) the spring-element force $F_S$, 41b, (2) the damping-element force $F_D$ 41a, and (3) the weight of the wheel assembly $W_{WA}$ 41c. If these forces are not in balance, the wheel assembly shown in the embodiment of FIG. 4 may begin to accelerate, relative to the vehicle body (not shown).

The force applied by the damping-element $F_D$ to the wheel assembly 5a, if the damping-element is a passive or semi-active damper, may initially (i.e. when the wheel assembly becomes airborne) be directed away from the vehicle body (i.e. downward) because of the pre-charge pressure. As the velocity of the wheel assembly increases in the downward direction under the influence of the net force acting on it, the force applied by the damping-element may reverse direction and become a resisting force to this motion. This resisting force may be proportional to the product of the damping coefficient of the damping-element and the velocity of the wheel assembly relative to the vehicle body. If the damping-element shown in FIG. 4 is an active actuator, the force $F_D$ may be, for example, a resisting force, an active-compression force, or an active-extension force. The force may be applied, for example, from the instant that the wheel 23a becomes airborne, after that point in time, or even prior to the wheel becoming airborne as commanded by one or more controllers of the active suspension actuator.

In the embodiment of FIG. 4, the magnitude and/or the timing of the force applied by the actuator may be commanded by a controller based on a prediction of the position of the wheel 23a relative to a pothole at the given speed of the vehicle. This prediction may be determined at least partly based on information from various sensors, for example, forward looking sensors such as LiDAR, radar, acoustic transducers and/or cameras. Alternatively or additionally, the prediction may be at least partially based on localization algorithms and/or map data from, for example, a digital remote or local (i.e. stored onboard the vehicle) map, GPS, terrain based localization data, data collected a leading wheel assembly of the vehicle to be used by a controller controlling, for example, a suspension actuator of a trailing wheel assembly, etc.

When the vehicle is supported by, for example, a road surface or another surface, the spring-element 10a may be compressed sufficiently to support the corner weight of the vehicle, either unaided or in conjunction with the precharge force applied by the damping element. As soon as the wheel becomes airborne, $F_S$, applied by the spring-element and the weight of the wheel assembly 5a, may cause the wheel assembly to accelerate downward. Concurrently, the damper element may apply a retarding force on the wheel assembly. The damper force, $F_D$, may be a function of the product of the velocity of the wheel assembly relative to the vehicle body and the damping coefficient of the damper element. In the case of passive dampers, the damping coefficient may be a constant, while in the case of a semi-active damper, the damping coefficient may be a variable quantity, in an operating range determined by a controller. If the damping-element is an active suspension actuator, it may be used to apply a force on the wheel assembly 5a that may at least partially or fully counter the force applied by the spring-element at any given position of the wheel assembly relative to the vehicle body. If the force capacity of the actuator is sufficient, the suspension actuator may be used to hold the wheel assembly in-place relative to the vehicle body or to even move it closer to the vehicle body (i.e. compress the suspension assembly). Alternatively, if the damping-element is only capable of applying a force that is less than the spring force, then the wheel assembly may accelerate away from the vehicle body at a rate that is proportional to the unbalanced force though this rate of acceleration may be less that it would be in the absence of the force applied by the damping-element.

Figure 5:
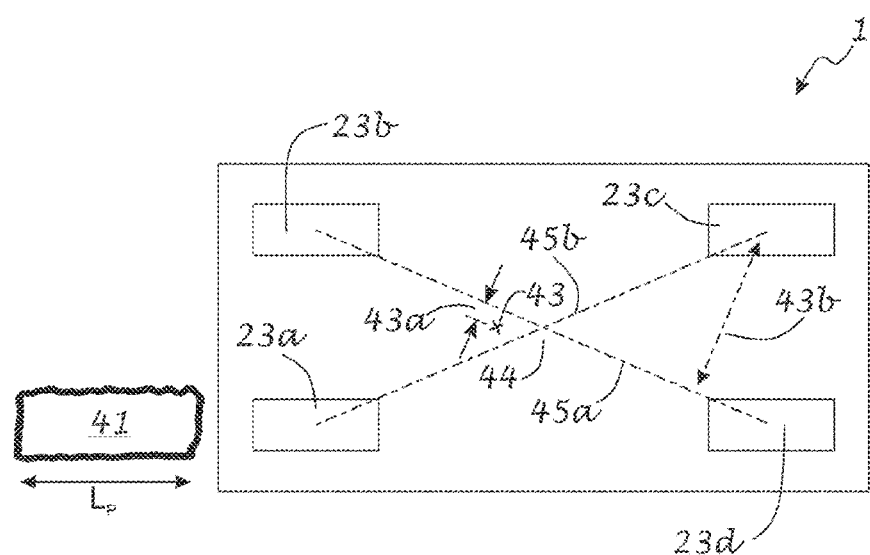
FIG. 5 illustrates the top view of a vehicle approaching a pothole.

FIG. 5 illustrates the top view of a vehicle 1 approaching a pothole 41 that is Lp meters long in the direction of travel of the vehicle. The vehicle may have four wheels: front left wheel 23a, front right wheel 23b, rear right wheel 23c, and rear left wheel 23d. Axis 45a connects the center of the contact patch of the front right wheel and the center of the contact patch of diagonally opposed rear left wheel. Axis 45b connects the center of the contact patch of the left front tire and the center of the contact patch of the diagonally opposed right rear tire. Intersection point 44 is the intersection of axis 45a and axis 45b and point 43 is the top view of the center-of-gravity of the vehicle 1. In the embodiment in FIG. 5, the center-of-gravity 43 is located in front of intersection point 44. However, in some embodiments, the center of gravity may be located in other positions relative to point 44 as determined by the mass distribution of the vehicle, the occupants, and the cargo carried by the vehicle, as the disclosure is not so limited. In this illustration, wheel 23a may enter the pothole 41 while wheels 23b, 23c, and 23d remain on a road surface. Alternatively, wheel 23d may enter the pothole 41 while wheels 23b, 23c, and 23a remain on a road surface. In some instances, the front left wheel 23a and rear left wheel may enter the pothole sequentially as the vehicle travels past the pothole.

In the embodiment illustrated in FIG. 5, if wheel 23a becomes airborne while traversing pothole 41, the road-reaction forces on all four tires may be affected. For example, since the airborne wheel 23a would not be in contact with the road, there would be no road reaction force which may cause there to be an unbalanced net force on the associated wheel assembly. In some embodiments, under these circumstances, the reaction to the TVW, acting on the center of gravity 43 may be borne by one or more of the other three wheels. The TVW of the vehicle acting on the center of gravity 43 may induce a moment about axis 45a equal to the weight of the vehicle multiplied by the moment arm 43a.

It is noted further that when wheel 23a (shown in FIG. 1) becomes airborne, and spring element 10a is at least partially unstressed, the force applied by compressed spring element 10d, of the diagonally opposed suspension assembly, may apply an unbalanced moment about axis 45a. This unbalanced moment may be in the same direction as the moment induced by the TVW acting on the center of gravity. Therefore, in some embodiments, at the time the wheel 23a becomes airborne, before the wheel 23a becomes airborne, and/or after the wheel 23a becomes airborne, a compressive force may be applied to suspension assembly 3d (shown in FIG. 1), for example by using a suspension actuator, to reduce or cancel the effect of the force applied by spring element 10d. For example, the compressive force applied by the suspension actuator may oppose an extension force applied by the associated spring which will reduce a net load applied to the wheel by the combined forces applied to the wheel by the spring and suspension actuator of the suspension assembly 3d. In some embodiments, the wheel at the opposing corner may be partially unloaded or fully unloaded. In either case, by reducing a force applied to the wheel assembly at the corner diametrically opposite a corner where a wheel is traversing a pothole, the unbalanced moment applied to the vehicle may be reduced which may reduce the movement of the wheel into the pothole as the wheel traverses the pothole.

As described above, in some embodiments of the vehicle illustrated in FIG. 1, when wheel 23a becomes airborne the diagonally opposed wheel may be off-loaded as well. As a result, an increased portion, and in some embodiments substantially all, of the TVW may be borne by suspension assembly 3b and/or suspension assembly 3c. Under such conditions, one or more suspension actuators that may be included in suspension assemblies 3b and 3c may be used to maintain the ride height of the vehicle by increasing the magnitude of the extension force interposed between the corresponding wheel assemblies and the vehicle body (sprung mass) to accommodate the portion of the TVW that has been offloaded from the other suspension assemblies. Alternatively, such suspension actuators may be used to raise the ride height or lower the ride height depending on the magnitude of the extension forces applied by the suspension actuators of the noted suspension assemblies.

Figure 6:
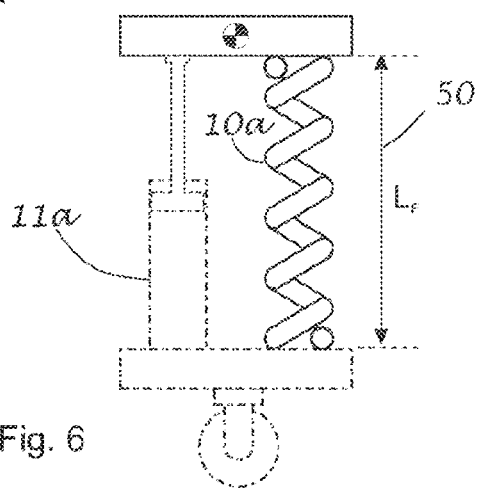
FIG. 6 illustrates suspension assembly of FIG. 2 where no forces are applied on the spring element.
Figure 7:
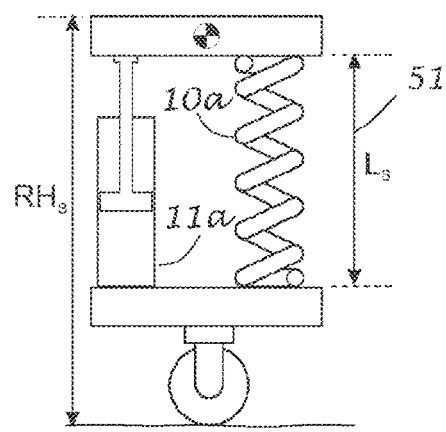
FIG. 7 illustrates suspension assembly of FIG. 2 where only static forces are applied to the spring element.
Figure 8:
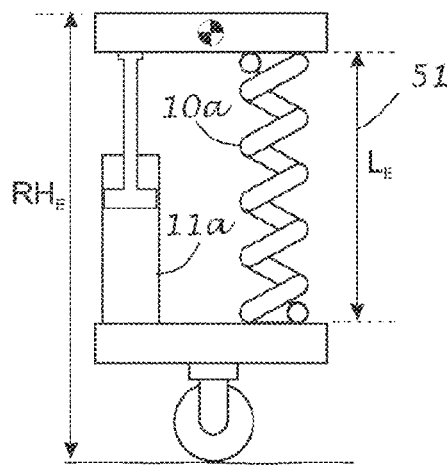
FIG. 8 illustrates suspension assembly of FIG. 2 where the spring element is extended by dynamic forces and/or an extension force applied by an active suspension actuator.
Figure 9:
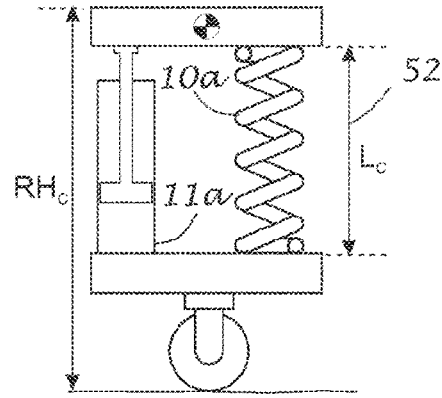
FIG. 9 illustrates suspension assembly of FIG. 2 where the spring element is compressed by dynamic forces and/or a compression force applied by the active suspension actuator.

FIGS. 6-9 illustrate various degrees of extension and compression of the suspension assembly of FIG. 2. In FIG. 6, no forces are applied to the spring element by the rest of the assembly (shown as a ghost view). Under these conditions, the spring-element may assume its free length $L_F$ 50. In FIG. 7 the suspension assembly is shown with only static forces present (i.e. no acceleration) where the spring element is at its static length $L_S$ 51. In this state, the spring element 10a and the pre-charge force applied by the damper element 11a support the front left corner weight of the vehicle. The length, $L_S$, may be determined by Equation 3.

$$W_{Corner^-}=K(L_F-L_S) \qquad \text{Eq. 3}$$

where K is the spring constant of the spring element 10a. FIGS. 8 and 9 show the spring element in an extended state and a compressed state respectively. The spring element may be extended by the application of an extension force or compressed by the application of a compression force. Such forces may result from dynamic forces acting on the vehicle body and/or due to forces applied by an active suspension actuator.

Figure 10:
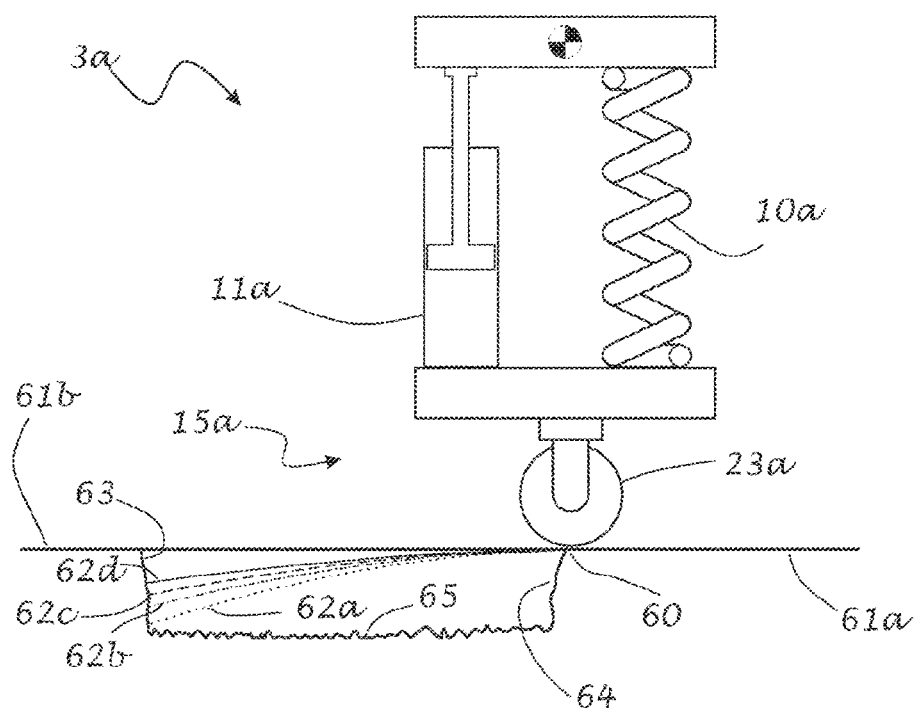
FIG. 10 illustrates four trajectories, of an airborne vehicle wheel while traversing a pothole.

FIG. 10 illustrates an operating condition where wheel 23a, of suspension assembly 3a, may become airborne (i.e. unsupported by the road surface, the ground or any other surface) while traversing, for example, a pothole or other discontinuity in a road surface 61a. Once airborne, as explained above, the wheel may descend into, for example, a pothole by following trajectories such as, for example, 63a, 63b, 63c, 63d. As discussed above, the trajectory followed may depend on, for example, the net force on the wheel assembly (including its weight) and the mass of the wheel assembly. The extent to which the wheel descends into the pothole will also depend on the speed of the vehicle and the length of the discontinuity along the direction of travel which may determine the length of the period during which the wheel remains airborne. Alternatively, the extent to which the wheel penetrates into the pothole may be limited or eliminated by a locking mechanism such as, for example, the locking system described below.

Figure 11:
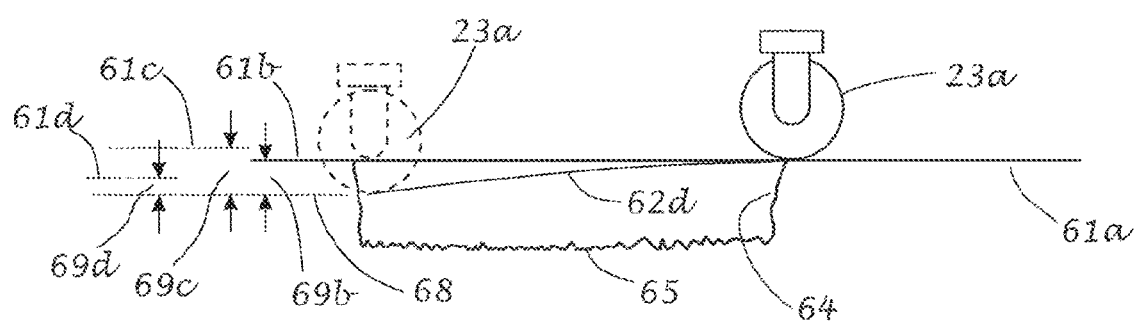
FIG. 11 illustrates the position of a vehicle wheel relative to three different end-of-pothole road surface elevations.

In the embodiment illustrated in FIG. 10, the beginning-of-pothole road surface elevation 61*a* is shown to be equal to the end-of-pothole road surface elevation of road surface 61*b*. However, as illustrated in FIG. 11, the end-of-pothole road surface elevation may be higher (road surface 61*c*) or lower (road surface 61*d*) than the beginning-of-pothole road surface elevation 61*a*. As shown in FIG. 11, the mismatch distance between the wheel 23*a* contact patch position at the end of the pothole (shown as a ghost view) 69*b*, 69*c*, and 69*d* may, at least, partly be a function of the end-of-pothole road surface elevation 61*b*, 61*c*, and 61*d*. Also, as shown in FIG. 11, a pothole may have a floor 65 that is at a lower elevation than both the beginning-of-pothole elevation and the end-of-pothole road surface elevation. A pothole may also include near-wall 64 and/or an end-wall 63, see FIG. 10.

The embodiment of a suspension system in FIG. 10 traversing a pothole may be operated under exemplary, non-limiting conditions detailed in Table I below:

TABLE I

Exemplary operating conditions

| | |
|---|---|
| Vehicle Mass ($M_S$) | 2,500 kg |
| Unsprung Mass ($M_{US}$) | 50 kg |
| Spring Rate | 25 N/mm |
| Pothole Length ($L_P$) | 0.8 m |
| Vehicle Speed | 40 mph |
| Vehicle Size | 1.9 m × 4.8 m |
| MOI | 850 kg m² | where MOI is the moment of inertia of the sprung mass about axis 45*a* shown in FIG. 5.

Figure 12:
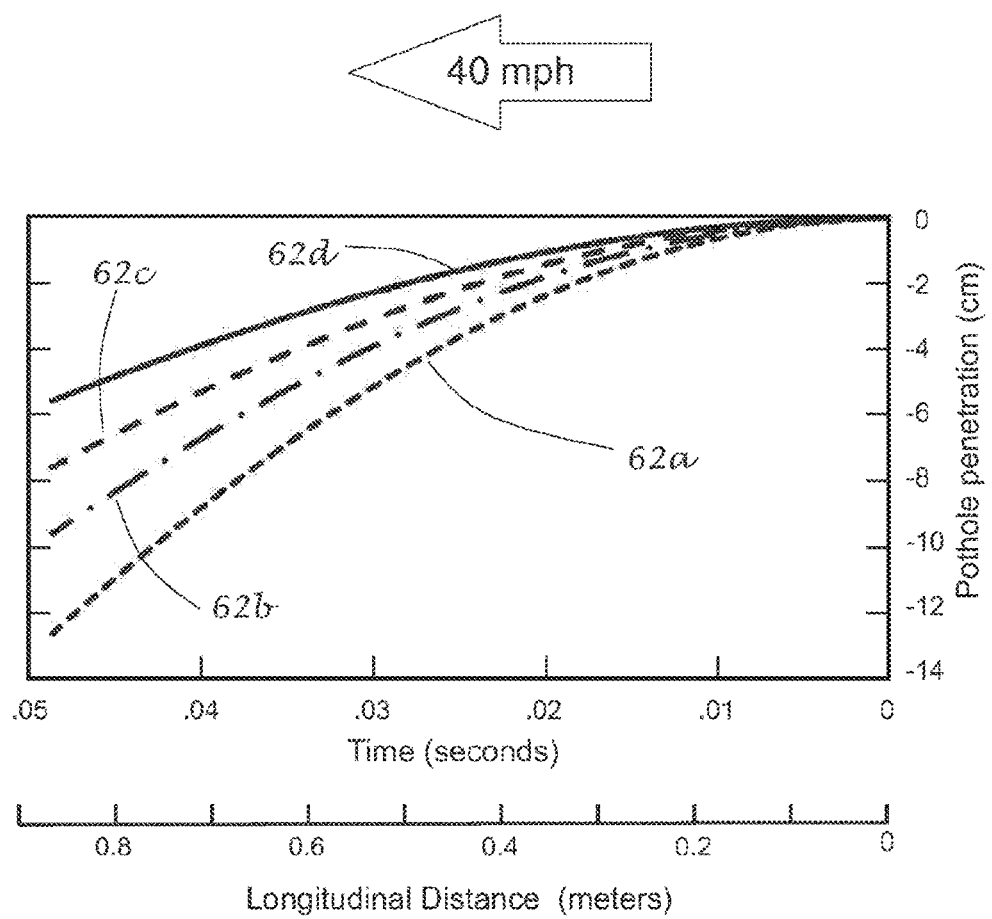
FIG. 12 illustrates the pot-hole penetration distance vs. longitudinal travel of the vehicle for various compression force levels produced by the active suspension actuator.

FIG. 12 shows the trajectory of wheel 23*a* of FIG. 10, from the point when it becomes airborne, as function of the compression-force applied by the damping element 11*a*. Table II shows the compression-force for each trajectory in FIG. 11.

TABLE II

Relationship between end pothole penetration and restraining force of the suspension actuator

| Trajectory | Compression Force (N) | End Pothole Penetration (cm) |
|---|---|---|
| 62a | 0 | −12 |
| 62b | 2000 | −9 |
| 62c | 3000 | −7 |
| 62d | 4000 | −5 |

For the exemplary embodiment and the operating conditions shown in FIG. 10 and Table I, there is significant penetration into the pothole for the four trajectories as illustrated in FIG. 12.

Figure 13:
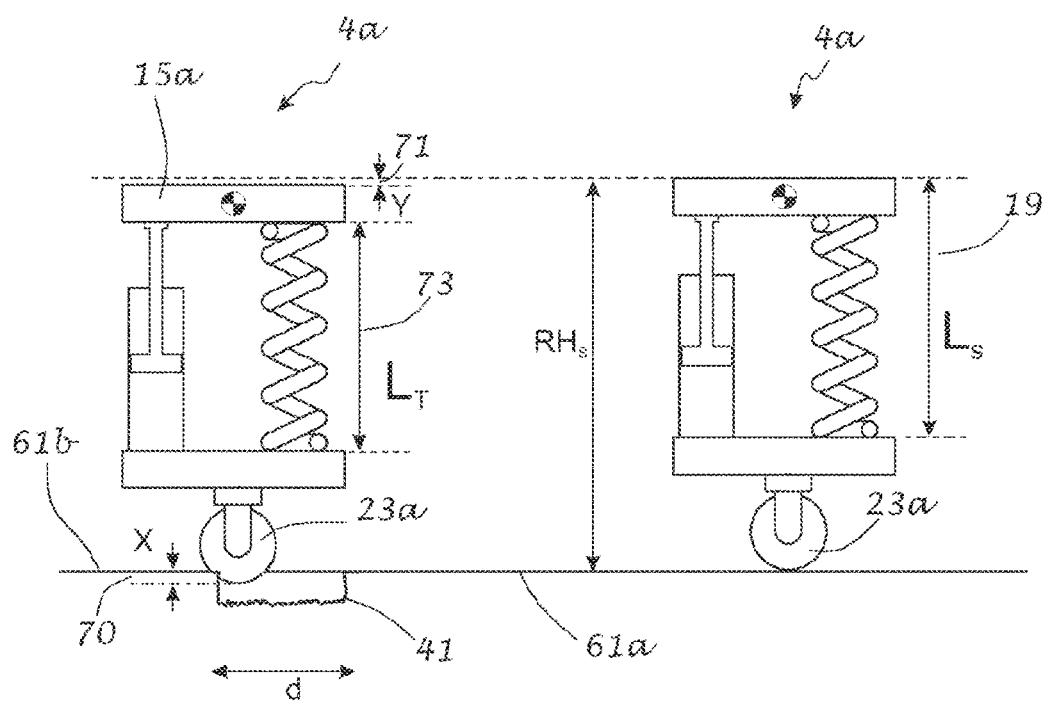
FIG. 13 illustrates the interaction of a wheel, that remains airborne while traversing a pothole, with the end-wall of the pothole.

FIG. 13 illustrates a condition where the there is sufficient intrusion into the pothole such that the wheel strikes the end-wall of the pothole. Striking the end-wall may cause damage to, for example, the wheel, tire and/or one or more suspension components. In the illustration of FIG. 12 the distance 70 ("X") represents how far the wheel has dropped below the top of the end-wall (or the end-of-pothole road surface elevation). The distance X may be equal to the sum of the amount of extension of spring element and a degree to which the corner of the vehicle dips towards the pothole due to the unbalanced moment applied to the vehicle when the wheel becomes airborne.

In the embodiment illustrated in FIG. 13, if wheel 23*a* becomes airborne when traversing a pothole, the upward force on the left front corner of the vehicle body may be reduced. It is noted that this force will not necessarily drop to zero immediately, for example, because the spring element may cause the wheel assembly to accelerate downwards by applying an unbalanced force. The spring may, as a result, also apply an equal and opposite force on the vehicle body.

Under some operating conditions, the vehicle may rotate about axis 55*a* in FIG. 5 as a result of the weight of the vehicle effectively acting on the center of gravity 53 and or an unbalanced force applied by spring element 11*c*. It is noted that the rotation about axis 55*a* may be greater if the wheel 23*a* is prevented from accelerating, or if the magnitude of the acceleration is diminished by applying a compression force with the active suspension actuator.

In FIG. 13, as a result of the corner of the vehicle dipping towards the pothole, the attachment device 5*a* may drop by an amount Y 71. Concurrently the spring element may extend by an amount Z such that X=Y+Z. As discussed above, the distance X depends partly on the length of time the wheel remains airborne which may depend on, for example, the length of the pothole "d", and the velocity of the vehicle. The mass of the wheel assembly and the forces applied by the spring element and the damper element may also affect the distance X. It is noted that the longer the pothole (length d) and the slower the speed of the vehicle, the further the wheel may drop into the pothole and the more severe the collision with the end-wall of the pothole.

Figure 14:
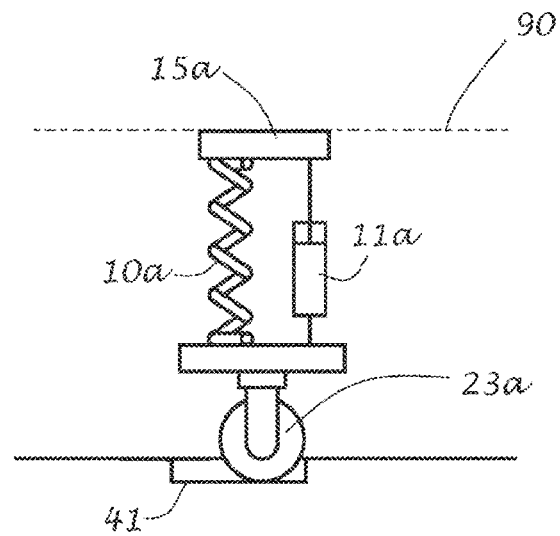
FIG. 14 illustrates a vehicle wheel that has entered a pothole and is travelling along the floor of the pothole.
Figure 15:
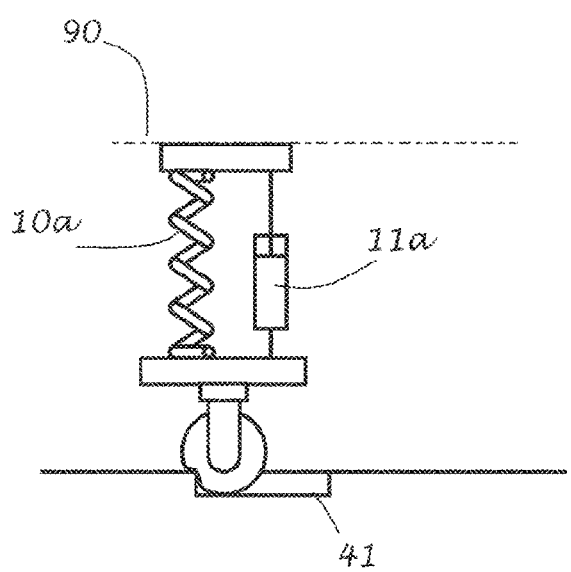
FIG. 15 illustrates the wheel of FIG. 14 that, after travelling along the bottom of the pothole, crashes into the end-wall.

Therefore, in some embodiments and under certain conditions it may be preferred to apply an extension force with an active suspension actuator, for example, before, after, or at the moment when a wheel starts traversing a pothole. FIG. 14 illustrates an operating condition where the active suspension actuator is used to apply an extension force to extend the suspension assembly so that wheel 23*a* may travel along the floor of the pothole instead of becoming airborne. When operating in this manner, the elevation 90 of the vehicle may be maintained by the suspension assembly despite the presence of the pothole. As illustrated in FIG. 15, the wheel 23*a* may strike the end-wall of pothole 41.

Figure 16:
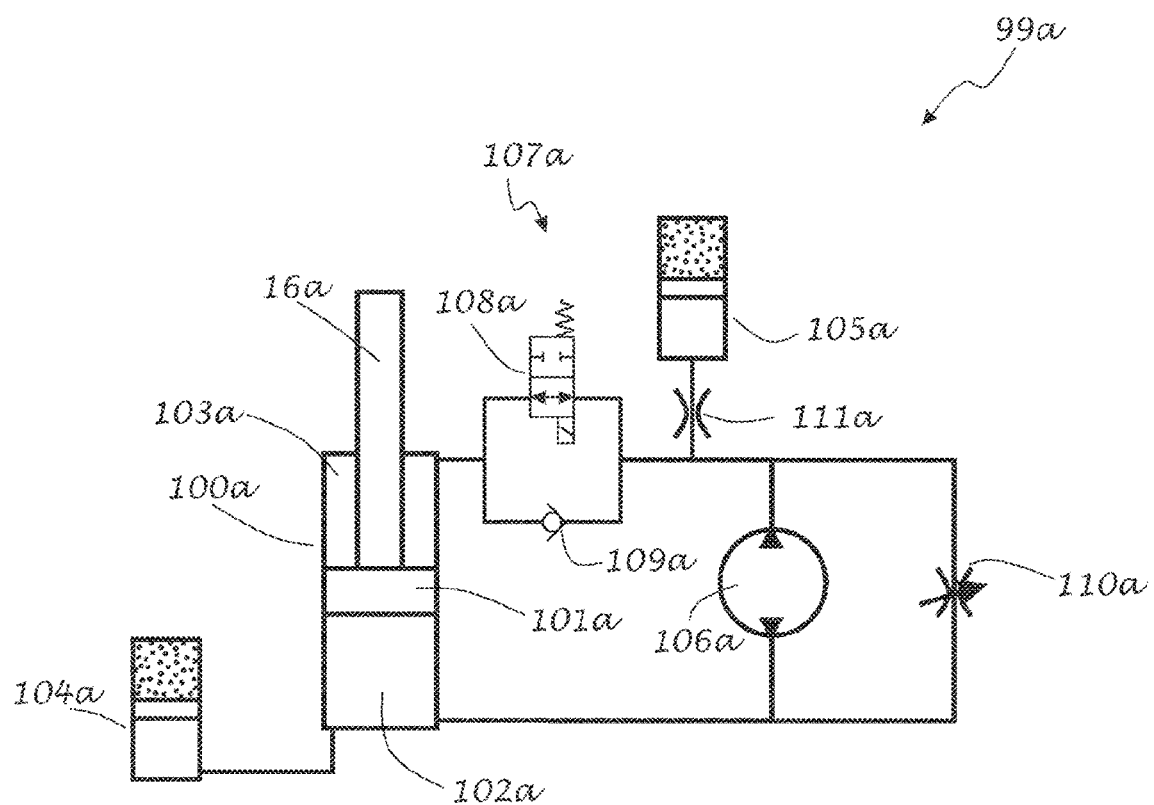
FIG. 16 illustrates a hydraulic active suspension system with a hydraulic lock to prevent actuator extension and a passive unidirectional bypass of the hydraulic lock.

FIG. 16 depicts an embodiment of an active suspension actuator 99*a*. Housing 100*a* includes a piston 101*a*, piston rod 16*a*, fluid filled compression volume 102*a*, and fluid filled extension volume 103*a*. The hydraulic circuit of FIG. 16 includes pressurized fluid reservoir 104*a* in fluid communication with the compression volume and fluid reservoir 105*a* in fluid communication with the extension volume. In some embodiments, these reservoirs are at least partially filled with, for example, air or other compressible medium. One port of a bi-directional hydraulic pump/motor 106*a* is in fluid communication with the compression volume 102*a* and a second port is in fluid communication with the extension volume 103*a*. In some embodiments, the bi-directional hydraulic pump/motor may be a hydraulic motor that may be operated as a hydraulic pump or a hydraulic pump that may be operated as a hydraulic motor.

In some embodiments, valve assembly 107*a* may be used to control fluid flow out of and/or into the extension volume. In some embodiments that valve assembly may include a two-position controlled valve 108*a* that in a first position allows free, or effectively free, bidirectional fluid flow to and from the extension volume, while in the second position it hydraulically locks the extension volume preventing fluid from leaving the extension volume and the active suspension actuator from undergoing extension. In some embodiments, check valve 109a may be used to allow unidirectional, unrestricted or effectively unrestricted flow into the extension volume. The check valve 109a may be configured to prevent cavitation in the extension volume in the event of rapid compression of the suspension actuator. Such rapid compression may occur, for example, when the wheel makes contact with the road surface after being airborne for a period while traversing a pothole.

In some embodiments a bypass control system 110a may be used to allow fluid exchange between the extension volume and the compression volume that bypasses the hydraulic pump/motor such that fluid flows between the extension volume and the compression volume without passing through the hydraulic pump/motor. The bypass control system may include one or more valves that may include one or more controlled valves. The hydraulic pump/motor may be used to actively control the motion of piston 101a. A flow restriction 111a may be interposed between the reservoir 105a and the hydraulic circuit. The restriction may act as a low pass filter that restricts the flow of fluid into and out of the reservoir at higher frequencies.

It should be understood that while a specific embodiment of a suspension actuator has been described above relative to FIG. 16, the current disclosure is not limited to only being implemented using the depicted actuator. Accordingly, any appropriate actuator capable of providing the desired functionalities described herein may be used as the disclosure is not limited in this fashion.

Figure 17:
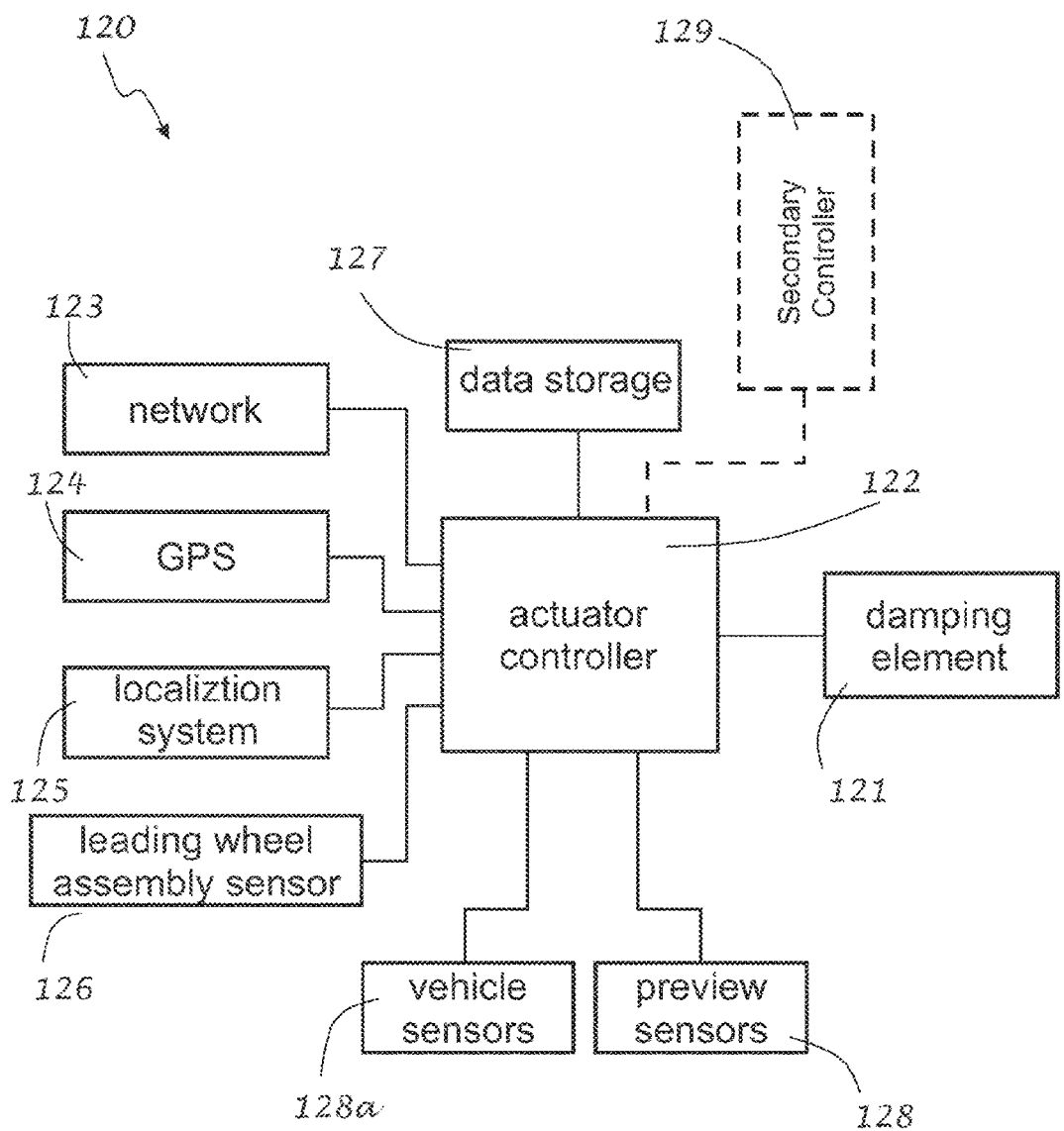
FIG. 17 illustrates an exemplary block diagram of a damping element control system.

FIG. 17 shows a block diagram of an embodiment of an exemplary control system 120 for controlling one or more damping element(s) 121 of a suspension assembly of a vehicle (not shown). The damping element may be, for example, a semi-active damper or an active suspension actuator. The controller 122 may receive information from one or more sources of information including, for example: (i) a network 123, such as a wireless network, (ii) a GPS receiver 124, (iii) localization algorithm 125, (iv) a leading wheel assembly sensor 126, (v) electronic data storage device such as computer memory or a disk drive, (vi) one or more preview sensor(s) 128 (e.g., LiDAR, radar, ultrasonic transducer, video camera) and vehicle sensor(s) 128a that measure one or more vehicle state parameters. The controller may also exchange information with one or more secondary controller(s) 129 in the vehicle. The controller may use data from one or more sources to determine, for example, the position of a pothole relative to the vehicle, the size of the pothole, the depth of the pothole, and speed of the vehicle. The controller may also collect information about the likelihood of avoiding the pothole. The controller may then determine a strategy for traversing.

In some embodiments, based on the information gathered, the controller may adjust the operation of one or more damping elements. For example, based on the information collected, the controller may elect to traverse a pothole while the wheel is airborne or traverse a pothole by entering it and traveling along the floor of the pothole. The controller 122 may adjust the damping coefficient of one or more semi-active damping elements or suspension actuator in various suspension subassemblies. Alternatively or additionally, the controller may elect to activate one or more hydraulic lock mechanisms.

For example, if it is determined that a pothole cannot be traversed while airborne, because the car is travelling too slowly or the pothole is too large, the controller may activate an active suspension actuator to extend the wheel so it travels along the floor of the pothole. Additionally the controller may increase the compression force when the wheel reaches the end-wall of the pothole to facilitate the extraction of the wheel from the pothole.

Alternatively or additionally the controller may directly, or by communicating with at least one other controller, alter the operation of at least one other suspension assembly. For example, the controller controlling the operation of a left front wheel of a vehicle may identify a pothole, determine its relative position, its size, and the speed of the vehicle. The controller may further elect to traverse the pothole while the wheel is airborne. The controller may determine that the left front wheel may strike the end-wall of the pothole with a certain mismatch. Additionally, the controller may directly or by communicating with at least one additional controller, operate at least one additional controller to raise at least a portion of the vehicle to reduce the projected mismatch between the left front wheel and the end-of-pothole road surface elevation. For example, the controller may cause the right front and left rear of the vehicle to be raised by an amount that is equal to or greater than the mismatch amount. Additionally or alternatively the controller may cause the actuator controller of the right rear suspension assembly to apply a compressive force on the spring element or to lock the right rear wheel assembly in place relative to the vehicle body while the right front wheel is airborne. It is noted that the vehicle may be an autonomous or driven vehicle.

In some embodiments, a vehicle may include a suspension assembly associated with each of four corners of the vehicle, such as the vehicle illustrated in FIG. 1. Each suspension assembly may support a portion of the TVW by applying a net force on the vehicle. Each suspension assembly may include an active suspension actuator that may be used to modify the net force being applied by each suspension assembly. In such an embodiment, at least partly based on a determination that a first wheel of a vehicle, such as wheel 5a, has become or is about to become airborne while traversing a pothole, a controller may be used to alter the operation of an active suspension actuator in one or more of the other suspension assemblies to change the net force being applied by one or more of those other suspension assemblies. This may be, for example, to at least partially compensate for the loss of support from the airborne first wheel. For example, in FIG. 1, the actuator net force applied by suspension assembly 3b and/or suspension assembly 3c located at adjacent corners to the first corner, may be increased. In some embodiments, the forces applied by suspension assembly 3c and/or 3d may be increased before or after the first wheel 23a becomes airborne.

Additionally or alternatively, at least partly based on the determination that the first wheel is airborne, a controller may also alter the operation of an active suspension actuator in the first suspension assembly associated with the first corner (e.g. 3a). The associated actuator may be used to, for example, apply a compressive force on the associated spring element (e.g. 1a.) to reduce or eliminate the penetration of the first wheel into the pothole. Additionally, in some embodiments, the actuator in the suspension assembly at the corner opposite the first corner may also be used to apply a compressive force on the associated spring element to mitigate or eliminate a roll moment induced by the spring element associated with the spring assembly at the fourth corner (e.g. spring element 3d).

In the above embodiments, a controller may be understood to refer to one or more processors operatively coupled with associated memory which may be a non-transitory computer readable medium. The memory may include computer readable instructions that when executed by the one or more processors operate the suspension systems, sensors, and other components described herein to perform any of the disclosed methods in any appropriate combination.

While the present teachings have been described in conjunction with various embodiments and examples, it is not intended that the present teachings be limited to such embodiments or examples. On the contrary, the present teachings encompass various alternatives, modifications, and equivalents, as will be appreciated by those of skill in the art. Accordingly, the foregoing description and drawings are by way of example only.

What is claimed is:

1. A method of controlling an active suspension actuator of a suspension assembly of a vehicle, the method comprising:
   collecting information about a pothole that has a floor and a length along a direction of travel of the vehicle;
   based at least partially on the information about the pothole, selecting one of at least two strategies for traversing the length of the pothole along the direction of travel with a wheel of a first suspension assembly, wherein a first strategy includes:
      traversing the length of the pothole along the direction of travel of the vehicle,
      during the traverse, penetrating the pothole with the wheel of the first suspension assembly without the wheel, of the first suspension assembly, contacting the floor of the pothole,
      during the traverse, applying a compressive force with the actuator, and
   wherein a second strategy includes:
      traversing a portion of the length of the pothole, along the direction of travel of the vehicle, while the wheel of the first suspension assembly is in contact with the pothole floor,
      during the traverse of the portion of the length of the pothole, along the direction of travel of the vehicle, applying an extension force with the actuator;
   activating the actuator a damping element of the first suspension assembly of the vehicle; and
   implementing the selected strategy.

2. The method of claim 1, further comprising collecting information about the vehicle, wherein selecting the strategy is also based on the information about the vehicle.

3. The method of claim 2, wherein information about the vehicle is selected from the group consisting of speed of the vehicle and mass distribution of a sprung mass of the vehicle.

4. The method of claim 3, wherein the information about the pothole includes a position of the vehicle relative to the pothole.

5. The method of claim 4, further comprising collecting information about the pothole with a controller, wherein the information is selected from the group consisting of map data, GPS data, terrain-based localization data, data from a wheel other than the wheel of the first suspension assembly of the vehicle.

6. The method of claim 1, wherein the selected strategy is the first strategy.

7. The method of claim 6, further comprising estimating a projected mismatch distance when the first wheel is at the end of the pothole.

8. The method of claim 7, further comprising increasing the ride height of the vehicle by using an actuator of a second suspension assembly during the period when the wheel of the first suspension assembly is traversing the pothole.

9. The method of claim 8, further comprising increasing the ride height of the vehicle by using an actuator of a third suspension assembly during the period when the wheel of the first suspension assembly is traversing the pothole.

10. The method of claim 9, further comprising applying a predetermined compressive force with the actuator of a fourth suspension assembly at least during the period when the wheel, of the first suspension assembly, is airborne, wherein the fourth suspension assembly is at a corner of the vehicle located diagonally opposite to a corner where the first suspension assembly is located.

11. The method of claim 1, wherein the selected strategy is the second strategy.

12. A method of controlling an active suspension system of a vehicle, the method comprising:
   detecting a pothole in a road surface, wherein the pothole has a floor;
   traversing the pothole with a wheel of a first suspension assembly of the active suspension system;
   during the traversal of the pothole, penetrating the pothole with the wheel;
   during the traversal of the pothole, controlling a suspension actuator of the first suspension assembly to apply a compressive force on a spring element operationally interposed between the vehicle's sprung mass and the wheel; and
   during the traversal of the pothole, keeping the wheel of the first suspension assembly from contacting the floor of the pothole.

13. The method of claim 12 further comprising controlling, during the traversal of the pothole with the wheel of a first suspension assembly of the active suspension system, a suspension actuator of at least a second suspension assembly, to increase an extension force on a spring element operationally interposed between the vehicle's sprung mass and a wheel of the second suspension assembly.

14. The method of claim 13 further comprising controlling, during the traversal of the pothole with the wheel of a first suspension assembly of the active suspension system, a suspension actuator of a third suspension assembly to increase a compressive force on a spring element operationally interposed between the vehicle's sprung mass and a wheel of the third suspension assembly.

15. A suspension system of a vehicle comprising:
   a first suspension assembly that includes:
      a spring element operationally interposed between the vehicle's sprung mass and a wheel assembly;
      a damping element, operationally interposed between the vehicle's sprung mass and the wheel assembly in parallel with the spring element, that includes:
         a hydraulic cylinder with a piston, connected to a piston rod, that separates the hydraulic cylinder into a compression volume and an extension volume; and
         a valve assembly configured to block fluid flow from the extension volume in a first mode of operation while allowing fluid flow into the extension volume during the first mode of operation.

16. The suspension system of claim 15 wherein the valve assembly is further configured to allow fluid flow into and out of the extension volume during a second mode of operation.

17. The suspension system of claim 16 wherein the valve assembly includes at least one valve that is electrically controlled.

* * * * *

UNITED STATES PATENT AND TRADEMARK OFFICE
CERTIFICATE OF CORRECTION

| | |
|---|---|
| PATENT NO. | : 11,724,555 B2 |
| APPLICATION NO. | : 17/285174 |
| DATED | : August 15, 2023 |
| INVENTOR(S) | : Gert-Jan Alexander Vente et al. |

It is certified that error appears in the above-identified patent and that said Letters Patent is hereby corrected as shown below:

In the Claims

At Column 15, Claim 1, Line 39, please delete "a damping element"

Signed and Sealed this
Nineteenth Day of September, 2023

Katherine Kelly Vidal
Director of the United States Patent and Trademark Office